United States Patent
Yamane et al.

[11] Patent Number: 5,812,707
[45] Date of Patent: Sep. 22, 1998

[54] POLARIZER HOUSING DEVICE FOR CONNECTING A POLARIZER TO AN OPTICAL WAVEGUIDE

[75] Inventors: Takashi Yamane; Nobuhiro Fukushima, both of Kawasaki; Shinya Sawae, Sapporo, all of Japan

[73] Assignee: Fujitsu Limited, Kawasaki, Japan

[21] Appl. No.: 797,204

[22] Filed: Feb. 11, 1997

[30] Foreign Application Priority Data

Mar. 8, 1996 [JP] Japan .................................. 8-051143

[51] Int. Cl.[6] ...................................... G02B 6/00
[52] U.S. Cl. .................................. 385/11; 385/4; 385/1; 385/31; 385/33
[58] Field of Search ...................... 385/11, 1–10, 385/12–15, 27–33; 356/345, 351

[56] References Cited

U.S. PATENT DOCUMENTS

| | | | |
|---|---|---|---|
| 4,932,783 | 6/1990 | Kersey et al. | 256/345 |
| 5,104,222 | 4/1992 | Kersey et al. | 356/345 |
| 5,444,803 | 8/1995 | Kim et al. | 385/28 |

FOREIGN PATENT DOCUMENTS

A-4-282608  7/1992  Japan .

OTHER PUBLICATIONS

Omori et al., "Broad–band LINbO$_3$ Polarization Scrambler", Proceedings of the 1996 IEICE General Conference, Tokyo, Japan, Mar. 28–31, 1996. (Japanese version and English language translation).

Primary Examiner—Phan T. H. Palmer
Attorney, Agent, or Firm—Staas & Halsey

[57] ABSTRACT

An apparatus, such as an optical modulator, which includes an optical waveguide and a polarizer housing device. The optical waveguide has an input end to receive light, and the polarizer housing device is connected to the input end of the optical waveguide. The polarizer housing device includes a polarizer which polarizes light, and a lens. A propagation space is in the polarizer housing device between the polarizer and the lens. The light polarized by the polarizer travels through the propagation space to the lens and is guided by the lens to the input end of the optical waveguide. The polarizer is bonded to the polarizer housing device with an adhesive so that no excess adhesive flows into the propagation space. Therefore, it is not necessary to use an optical adhesive to bond the polarizer to the polarizer housing device.

20 Claims, 8 Drawing Sheets

POLARIZER HOUSING DEVICE FOR CONNECTING A POLARIZER TO AN OPTICAL WAVEGUIDE

CROSS-REFERENCE TO RELATED APPLICATIONS

This application is based on, and claims priority to, Japanese patent application number 08-051143, filed Mar. 8, 1996, in Japan, and which is incorporated herein by reference.

BACKGROUND OF THE INVENTION

1. Field of the Invention

The present invention relates to a polarizer housing device for connecting a polarizer to an optical waveguide and, more particularly, to a polarizer housing device which provides a propagation space between the polarizer and the optical waveguide so that light polarized by the polarizer travels through the propagation space before entering the optical waveguide.

2. Description of the Related Art

Optical communication systems are used to provide high-speed data transmission, and typically employ an optical modulator to modulate optical signals with electrical signals. Therefore, it is desirably for an optical modulator to provide high-speed optical modulation, and thereby allow an optical communication system with high-speed data transmission.

An optical modulator typically includes an optical waveguide. For example, an LN optical modulator includes a Mach-Zehnder optical waveguide having a diffused Ti film formed in an LiNbO3 crystal. The LN optical modulator generates a binary optical signal by using an applied voltage to control the phase of light propagating in the Mach-Zehnder optical waveguide. The light propagating in the Mach-Zehnder optical waveguide should be single-mode/TM polarized light. Moreover, TM polarized light has properties that largely depend on a drive voltage, optical insertion loss, frequency band and extinction ratio of the optical modulator.

Japanese patent laid-open publication No. 04-282608 (Japanese patent application 03-46850) discloses an LN optical modulator which has a relatively high extinction ratio, and thereby provides increased transmission speed. More specifically, Japanese patent laid-open publication No. 04-282608 (Japanese patent application 03-46850) discloses an optical modulator having a small polarizer with a high extinction ratio bonded to an input end of an optical waveguide, or to both the input end and an output end of the optical waveguide. Such an optical modulator allows light to be applied directly to the input end of the waveguide from a light source through an ordinary optical fiber, and does not require strict optical axis alignment for adjusting the polarization plane at the input end of the waveguide.

However, an optical waveguide as disclosed in Japanese patent laid-open publication No. 04-282608 (Japanese patent application 03-46850) is very small in size. For example, a cross-section of an optical waveguide having a diffused Ti film formed in an LiNbO3 crystal has a maximum diameter of 7 $\mu$m. Therefore, it is difficult to bond a polarizer to an end of the optical waveguide. In addition, it is difficult to align the polarization direction of the polarizer with respect to the optical waveguide.

Moreover, an optical modulator as disclosed in Japanese patent laid-open publication No. 04-282608 (Japanese patent application 03-46850) would require the polarizer and the optical waveguide to be bonded together by an optical adhesive which transmits light therethrough. Similarly, the polarizer and an optical fiber supplying light to the polarizer must be bonded together by an optical adhesive which transmits light therethrough. However, such an optical adhesive provides the required bonding strength only in a specific, narrow temperature range. As a result, the bonding strength of the optical adhesive is undesirably low when the optical modulator is used, for example, in a high temperature environment.

SUMMARY OF THE INVENTION

Accordingly, it is an object of the present invention to provide an optical modulator having an optical waveguide and a polarizer housing device, wherein the polarizer housing device allows a polarizer to be easily and efficiently installed on the optical waveguide and permits the polarizer to be mounted with improved strength.

It is a further object of the present invention to provide an optical modulator which produces stable TM polarized light by maintaining a high extinction ratio.

Additional objects and advantages of the invention will be set forth in part in the description which follows, and, in part, will be obvious from the description, or may be learned by practice of the invention.

The foregoing objects of the present invention are achieved by providing an apparatus which includes an optical waveguide and a polarizer housing device. The optical waveguide has an input end to receive light. The polarizer housing device is connected, preferably by laser beam welding, to the input end of the optical waveguide and includes a polarizer which polarizes light. A propagation space exists in the polarizer housing device between the polarizer and the input end of the optical waveguide. The light polarized by the polarizer travels through the propagation space to the input end of the optical waveguide. The polarizer housing device can also be provided with a lens. In this case, the propagation space is in the polarizer housing device between the polarizer and the lens. The light polarized by the polarizer travels through the propagation space to the lens and is guided by the lens to the input end of the optical waveguide.

Objects of the present invention are also achieved by providing an optical modulator which includes a Mach-Zehnder optical waveguide having an input end to receive light, and a polarizer housing device connected to the input end of the optical waveguide. The polarizer housing device includes a polarizer which polarizes light, and a lens. A propagation space is in the polarizer housing device between the polarizer and the lens. The light polarized by the polarizer travels through the propagation space to the lens and is guided by the lens to the input end of the optical waveguide.

Moreover, objects of the present invention are achieved by providing an apparatus which connects to an input end of an optical waveguide for providing polarized light to the optical waveguide. The apparatus includes a housing and a polarizer. The polarizer is inside the housing and polarizes light. When the apparatus is connected to the input end of the optical waveguide, (a) a propagation space exists in the polarizer housing device between the polarizer and the input end of the optical waveguide, and (b) the light polarized by the polarizer travels through the propagation space to the input end of the optical waveguide.

BRIEF DESCRIPTION OF THE DRAWINGS

These and other objects and advantages of the invention will become apparent and more readily appreciated from the following description of the preferred embodiments, taken in conjunction with the accompanying drawings of which.

DETAILED DESCRIPTION OF THE PREFERRED EMBODIMENTS

Figure 1:
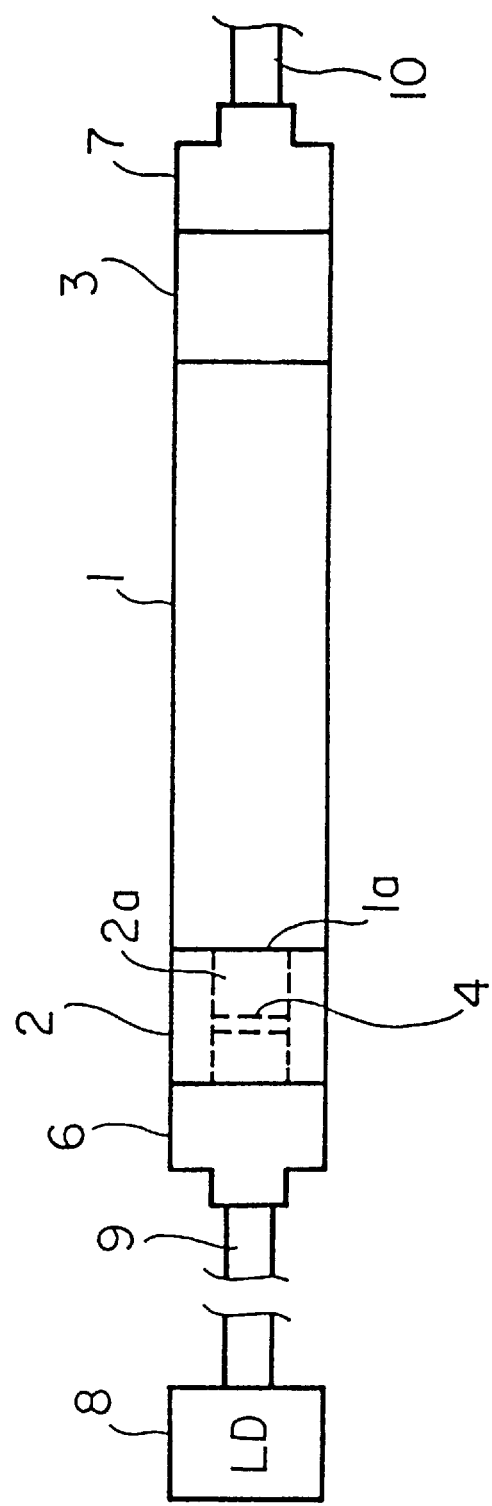
FIG. 1 is a diagram illustrating an optical waveguide having a polarizing housing device attached thereto, according to an embodiment of the present invention.

Reference will now be made in detail to the present preferred embodiments of the present invention, examples of which are illustrated in the accompanying drawings, wherein like reference numerals refer to like elements throughout.

FIG. 1 is a diagram illustrating an optical waveguide having a polarizing housing device attached thereto, according to an embodiment of the present invention. Referring now to FIG. 1, an optical waveguide 1 has an input end 1a. A polarizer housing device 2 is connected to input end 1a of optical waveguide 1. Polarizer housing device 2 includes a polarizer 4. A propagation space 2a in polarizer housing device 2 is between polarizer 4 and end face 1a of optical waveguide 1. Thus, light passes from polarizer 4, through propagation space 2a, to enter optical waveguide 1 through input end 1a. Optical waveguide 1 is, for example, a Mach-Zehnder optical waveguide used as an LN optical modulator. Polarizer housing device 2 is preferably connected to optical waveguide 1 by laser beam welding.

A housing device 3 is connected to an output end of optical waveguide 1. A fiber holder 6 holds and connects an optical fiber 9 to polarizer housing device 2, and a fiber holder 7 holds and connects an optical fiber 10 to housing device 3. Preferably, fiber holders 6 and 7 are connected, respectively, to polarizer housing devices 2 and 3 by laser beam welding.

A semiconductor laser 8 emits light and provides the emitted light to optical waveguide 1. Therefore, the light emitted by semiconductor laser 8 successively passes through optical fiber 9, fiber holder 6 and polarizer housing device 2, to enter optical waveguide 1. The light is then processed in optical waveguide 1, and output through housing device 3 and fiber holder 7 to optical fiber 10.

Figure 2:
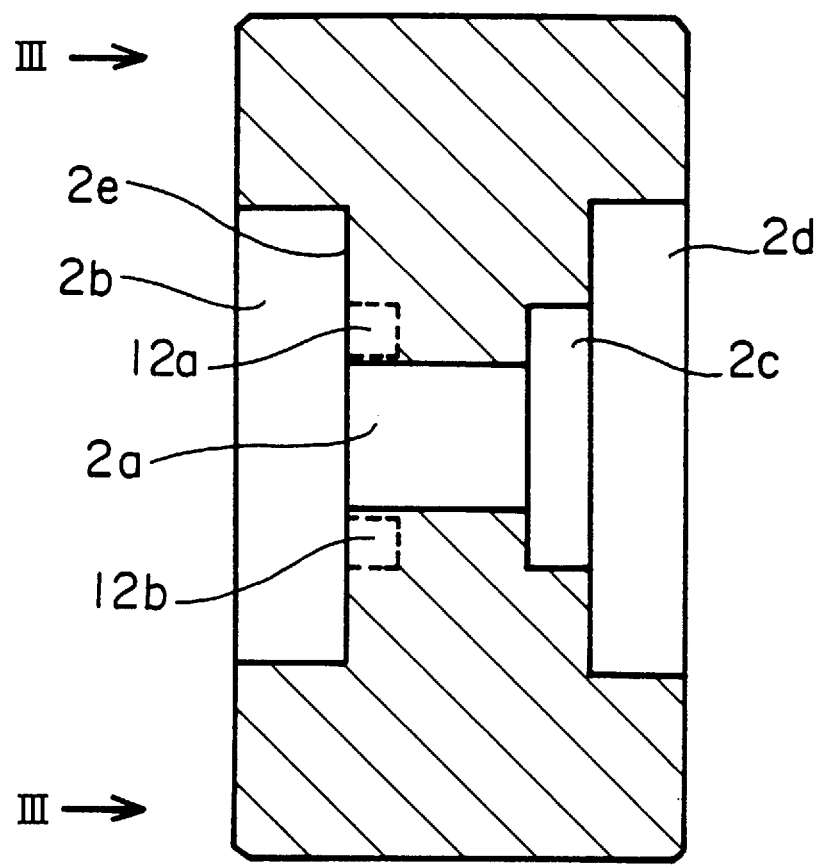
FIG. 2 is a cross-section of a polarizer housing device, according to an embodiment of the present invention.
Figure 3:
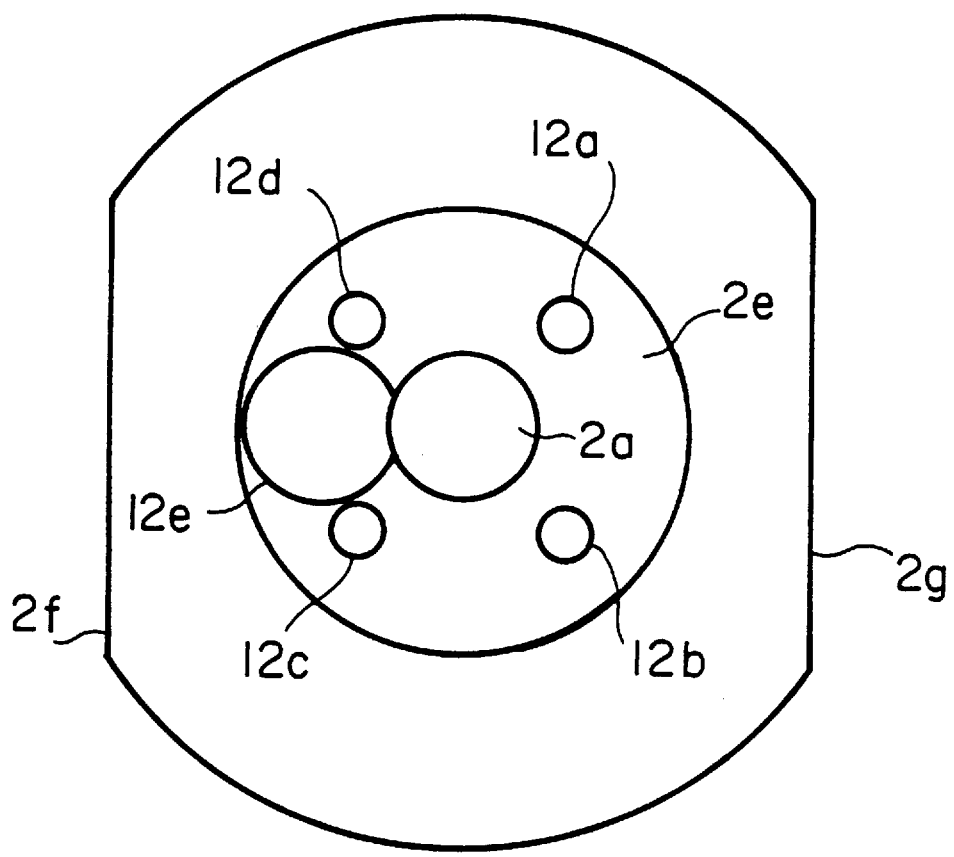
FIG. 3 is a diagram illustrating a view along lines III—III of the polarizer housing device illustrated in FIG. 2, according to an embodiment of the present invention.

FIG. 2 is a cross-section of polarizer housing device 2, according to an embodiment of the present invention, and FIG. 3 is a diagram illustrating a view along lines III—III in FIG. 2 of polarizer housing device 2, according to an embodiment of the present invention. Referring now to FIGS. 2 and 3, polarizer housing device 2 has a propagation space 2a through which light propagates. Propagation space 2a is preferably cylindrical and is centrally arranged in polarizer housing device 2. Propagation space 2a extends along a path in which light propagates through polarizer housing device 2. Polarizer housing device 2 also has a space 2b which is preferably cylindrical and is arranged in an end of polarizer housing device close to fiber holder 6. Space 2b is in communication with (that is, it "connects to") propagation space 2a, and has a diameter which is larger than the diameter of propagation space 2a.

Polarizer housing device 2 further has a space 2c which is preferably cylindrical and is arranged in a portion of polarizer housing device 2 close to optical waveguide 1. Space 2c is in communication with (that is, it "connects to") propagation space 2a, and has a diameter larger than the diameter of propagation space 2a. A space 2d is preferably cylindrical and is arranged in an end of polarizer housing device 2 close to optical waveguide 1. Space 2d is in communication with space 2c, and has a diameter larger than the diameter of space 2c. Polarizer housing device 2 has a surface 2e which partly defines space 2b and has holes 12a, 12b, 12c and 12d defined therein at angularly spaced intervals around propagation space 2a. Surface 2e also has a hole 12e between holes 12d and 12c. Holes 12a, 12b, 12c and 12d are arranged radially outwardly from propagation space 2a and serve to accommodate an excessive adhesive, as described in more detail further below.

Hole 12e communicates with propagation space 2a and is preferably cylindrical shaped. Preferably, hole 12e has a diameter greater than the diameter of holes 12a, 12b, 12c and 12d. Hole 12e provides a connection between space 2b and propagation space 2a when polarizer 4 is installed in position inside polarizer housing device 2. A lens (not illustrated in FIGS. 2 and 3, but described in more detail further below with reference to FIG. 5) is housed in space 2c. Polarizer housing device 2 has a pair of diametrically opposite flat surfaces 2f and 2g defined in an outer circumferential surface.

Figure 4:
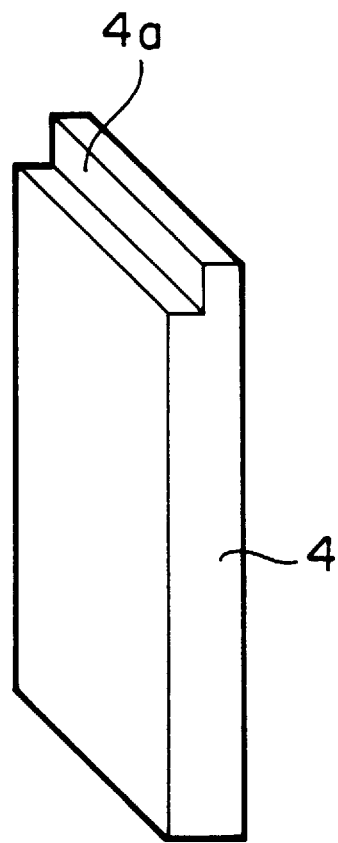
FIG. 4 is a diagram illustrating a perspective view of a polarizer of the polarizer housing device illustrated in FIG. 1, according to an embodiment of the present invention.

FIG. 4 is a diagram illustrating a perspective view of polarizer 4, according to an embodiment of the present invention. Referring now to FIG. 4, polarizer 4 is, for example, a rutile plate cut from a wafer of birefringent crystal of rutile in the polarization direction. Preferably, for example, polarizer 4 has a two-dimensional size of approximately 3×3 mm and a thickness of approximately 200 $\mu$m. As illustrated in FIG. 4, polarizer 4 has a cut recess 4a defined in a corner thereof, for identifying the polarization direction, a face side and reverse side. However, polarizer 4 is not intended to be limited to having a cut recess, such as cut recess 4a. Instead, polarizer can have any other indicia or identifier to identify a polarization direction, a face side and a reverse side. Moreover, polarizer 4 is not intended to be limited to any particular shape, and can be formed in any suitable shape. Further, polarizer 4 is not intended to be limited to being made of rutile, and can be made of any suitable material. For example, polarizer 4 may be constructed of lamipol (a registered trademark of Sumitomo Cement Co., LTD).

A process of installing polarizer 4 in polarizer housing device 2 is described with reference to FIG. 5.

Figure 5:
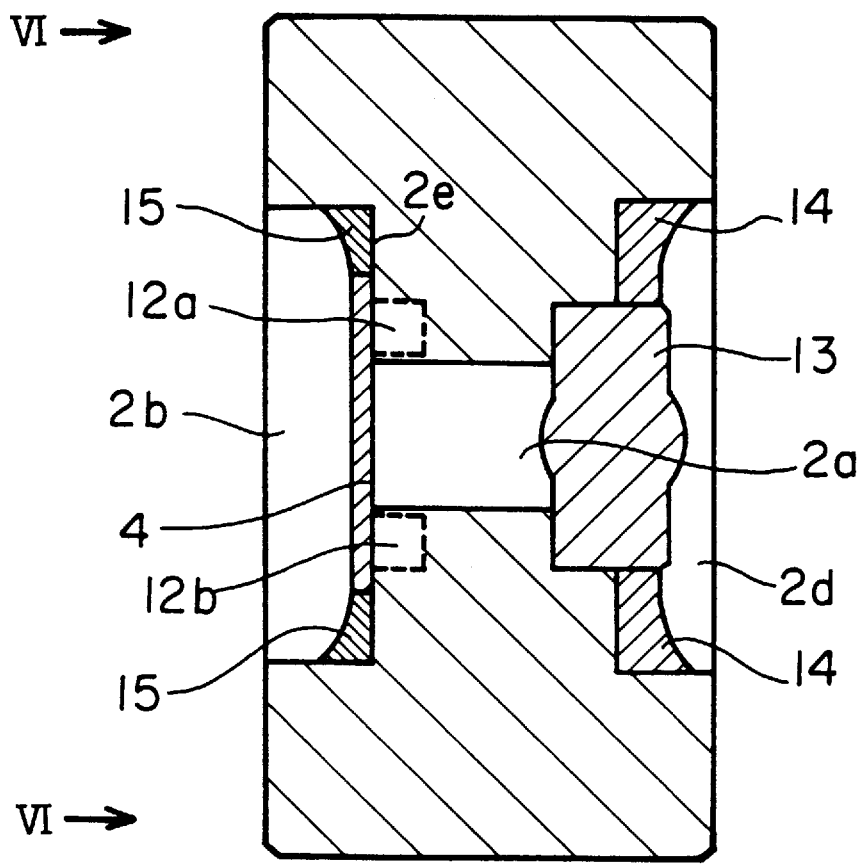
FIG. 5 is a diagram illustrating a cross-section of a polarizer housing device having a lens therein, according to an embodiment of the present invention.

More specifically, FIG. 5 is a diagram illustrating a cross-section of polarizer housing device 2 having a lens 13 arranged therein, according to an embodiment of the present invention. Referring now to FIG. 5, lens 13 is positioned in space 2c, and is fixed in position by a layer 14 of, for example, low-melting glass. Space 2c is shaped in advance to the size of lens 13. After fixing lens 13 in space 2c, polarizer 4 is fixed to surface 2e of polarizer housing device 2.

Figure 6:
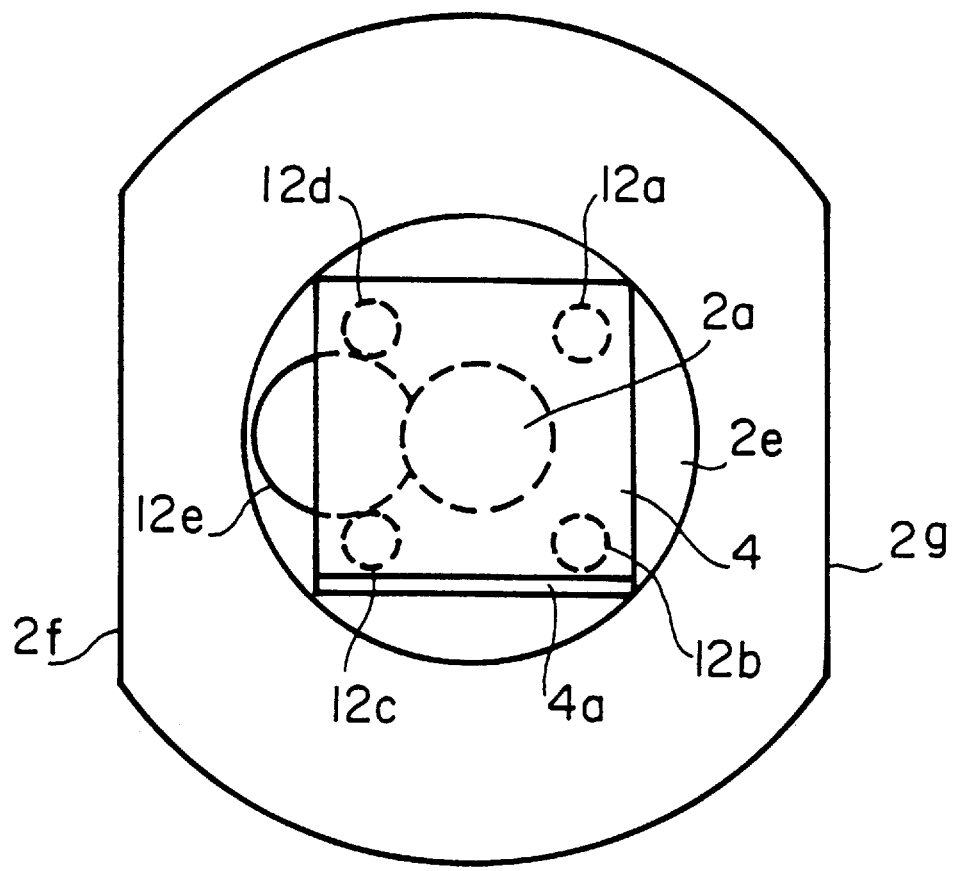
FIG. 6 is a diagram illustrating a view along lines VI—VI of the polarizer housing device illustrated in FIG. 5, according to an embodiment of the present invention.

FIG. 6 is a diagram illustrating a view along lines VI—VI of polarizer housing device 2 as illustrated in FIG. 5, according to an embodiment of the present invention. Referring now to FIG. 6, polarizer 4 is first positioned such that cut recess 4a is arranged in a certain orientation with respect to flat surfaces 2f and 2g of polarizer housing device 2, and is then bonded to surface 2e by an adhesive 15 (see FIG. 5). If, for example, optical waveguide 1 is used as an LN optical modulator, cut recess 4a is oriented at 90° with respect to flat surfaces 2f and 2g in order to introduce only TM polarized light into optical waveguide 1.

Adhesive 15 is coated on the surface of polarizer 4 which is held against surface 2e, but not on the portion of the surface of polarizer 4 which faces propagation space 2a. When polarizer 4 is pressed against surface 2e, any excess of the applied adhesive 15 which is forced from between polarizer 4 and surface 2e finds its way into holes 12a, 12b, 12c, 12d and hole 12e. Therefore, no excessive adhesive flows into propagation space 2a. In effect, each hole 12a, 12b, 12c, 12d and 12e acts as a "reservoir" which is positioned to absorb excess adhesive used to bond polarizer 4 to surface 2e, so that the excess adhesive does not flow into propagation space 2a.

Since adhesive 15 is present between polarizer 4 and surface 2e and does not flow into propagation space 2a, adhesive 15 is not required to be an optical adhesive which transmits light therethrough. Therefore, adhesive 15 may have a wider temperature range, in contrast to an optical adhesive with allows light to be transmitted therethrough and is required to be used in the optical modulator disclosed in Japanese patent application 03-46850, discussed in the Background of the Invention section. As a result, the bonding strength of adhesive 15 remains relatively high even at high temperatures, so that polarizer 4 will not peel off of surface 2e.

After polarizer 4 is bonded to surface 2e, hole 12e allows communication between space 2b and propagation space 2a, as shown in FIG. 6. Propagation space 2a in polarizer housing device 2 is not hermetically closed, and hence water is prevented from being condensed on the inner surface of polarizer 4.

Housing device 3 has a propagating space (not illustrated) for propagating light therethrough, and a lens (not illustrated). Generally, housing device 3 does not include a polarizer but, in certain situations, can be provided with a polarizer. For example, if optical waveguide 1 is used as a polarization scrambler, then housing device 3 does not include a polarizer. However, when housing device 3 includes a lens and a polarizer, housing device 3 can be configured in a similar manner as polarizer housing device 2.

Therefore, according to the above embodiments of the present invention, light propagating through optical fiber 9 passes through polarizer 4 and lens 13 in polarizer housing device 2 and is transmitted to optical waveguide 1. As a result, even when the light applied to polarizer 4 contains polarized light other than TM polarized light, the polarized light other than TM polarized light is removed by polarizer 4, and only the required polarized light is applied to optical waveguide 1 when optical waveguide 1 is used as an LN optical modulator. With this configuration, polarizer 4 can maintain an extinction ratio of approximately 60 dB or higher.

Figure 7:
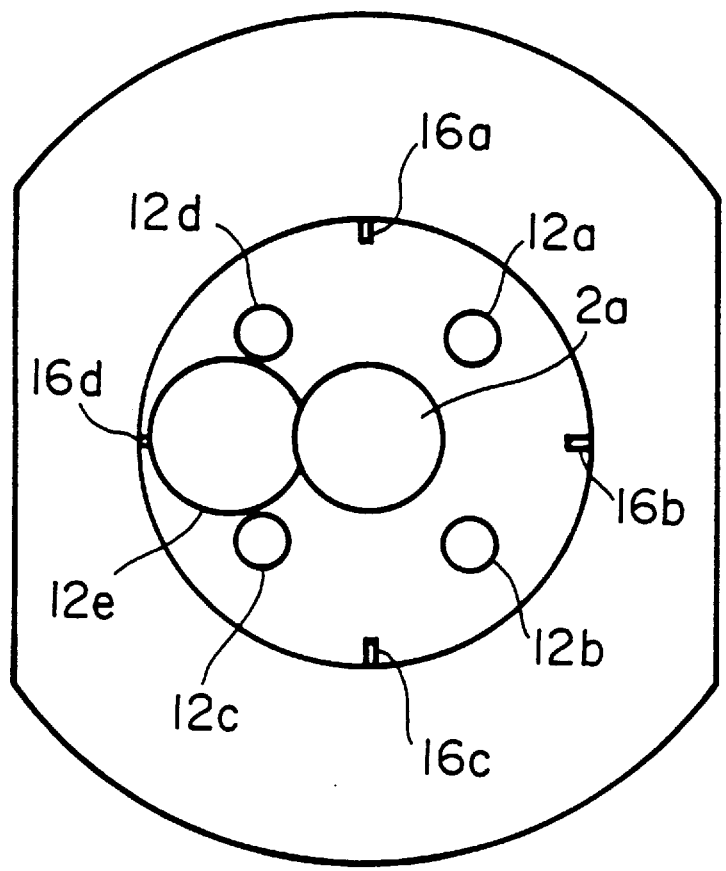
FIG. 7 is a diagram illustrating a view along lines III—III of the polarizer housing device illustrated in FIG. 2, and showing positioning markers for positioning a polarizer, according to an additional embodiment of the present invention.

Whereas FIG. 6 illustrates cut recess 4a of polarizer 4 for determining an orientation with respect to flat surfaces 2f and 2g of polarizer housing device 2, FIG. 7 illustrates an additional embodiment of the present invention for determining the orientation of polarizer 4.

More specifically, FIG. 7 is a diagram illustrating a view along lines III—III of polarizer housing device 2 as illustrated in FIG. 2, and showing positioning markers for positioning polarizer 4, according to an additional embodiment of the present invention. Referring now to FIG. 7, surface 2e of polarizer housing device 2 has positioning markers 16a, 16b, 16c and 16d disposed on an outer circumferential edge thereof at angularly spaced intervals around propagation space 2a. Polarizer 4 can be adjusted to a certain orientation with respect to positioning markers 16a, 16b, 16c and 16d.

Figure 8:
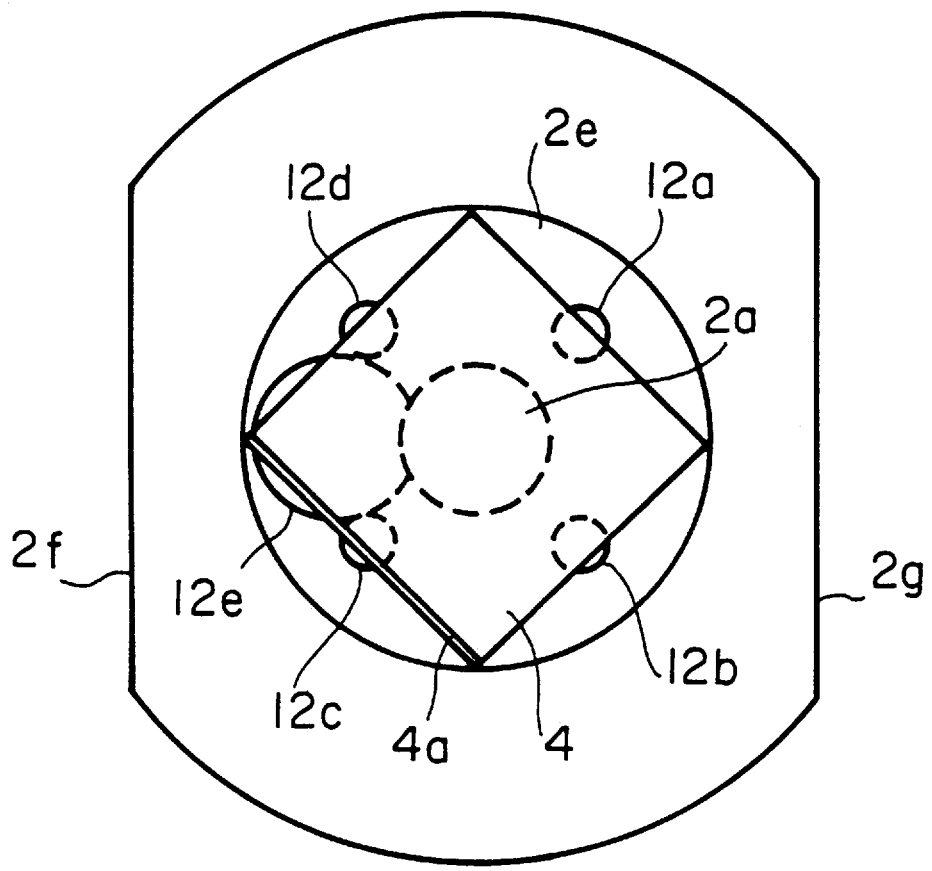
FIG. 8 is a diagram illustrating a view along lines VI—VI of the polarizer housing device illustrated in FIG. 5, according to an additional embodiment of the present invention.

FIG. 8 is a diagram illustrating a view along lines VI—VI of polarizer housing device 2 as illustrated in FIG. 5, according to an additional embodiment of the present invention. In FIG. 8, optical waveguide 1 is, for example, for use as a polarization scrambler, so the polarization plane of light applied to optical waveguide 1 is different from the polarization plane of light applied to optical waveguide 1 according to embodiments of the present invention where optical waveguide 1 is used as an optical modulator.

Referring now to FIG. 8, polarizer 4 is positioned so that cut recess 4a is oriented at 45° with respect to flat surfaces 2f and 2g, to introduce only TM polarized light into optical waveguide 1. Then, polarizer 4 is fixed in position by adhesive 15. Cut recess 4a is oriented at 45° with respect to flat surfaces 2f and 2g because optical waveguide 1 is for use as a polarization scrambler. With this angular adjustment of cut recess 4a, TE polarized light and TM polarized light, 50% each, are transmitted to optical waveguide 1.

In FIG. 8, adhesive 15 is also coated on the surface of polarizer 4 which is held against surface 2e, but not on the portion of the surface of polarizer 4 which faces propagation space 2a. When polarizer 4 is pressed against surface 2e, any excess of the applied adhesive 15 which is forced from between polarizer 4 and surface 2e finds its way into holes 12a, 12b, 12c, 12d and hole 12e. Therefore, no excessive adhesive flows into propagation space 2a. Hole 12e provides communication between space 2b and propagation space 2a.

According to the above embodiments of the present invention, optical waveguide 1 can be used as either an LN optical modulator or a polarization scrambler, respectively. However, optical waveguide 1 is not intended to be limited to these uses. For example, optical waveguide 1 may be used as a phase modulator or a directional coupler.

According to the above embodiments of the present invention, optical waveguide 1 is, for example, formed on an electro-optical crystal substrate.

According to the above embodiments of the present invention, a polarizer housing device is connected to an optical waveguide. The polarizer housing device has a propagation space for propagating light therein and a polarizer disposed in the propagation space. The polarizer housing device is sufficiently larger than a conventional polarizer, by itself, and hence can be easily and efficiently installed.

According to the above embodiments of the present invention, a polarizer is bonded to a polarizer housing device with an adhesive having a wide temperature range in which the adhesive is effective. Consequently, it is not necessary to use a special optical adhesive.

Moreover, according to the above embodiments of the present invention, it is preferably for a polarizer housing device and an optical waveguide to be joined to each other by laser beam welding, to provide a strong connection.

According to the above embodiments of the present invention, a polarizer housing device (such as polarizer housing device 2) includes a polarizer and a lens. Thus, the polarizer housing device is a housing or a holding device for holding the polarizer and the lens in a defined relationship, and for connecting the polarizer and the lens to an optical waveguide. For example, the polarizer housing device is simply a housing which maintains a positioning relationship between the polarizer and the lens with a propagating space inside the polarizer housing device and between the polarizer and the lens.

Although a few preferred embodiments of the present invention have been shown and described, it would be appreciated by those skilled in the art that changes may be made in these embodiments without departing from the principles and spirit of the invention, the scope of which is defined in the claims and their equivalents.

What is claimed is:

1. An apparatus comprising:

an optical waveguide having an input end to receive light; and a polarizer housing device connected to the input end of the optical waveguide and including a polarizer which polarizes light, a propagation space existing in the polarizer housing device between the polarizer and the input end of the optical waveguide, wherein the light polarized by the polarizer travels through the propagation space to the input end of the optical waveguide.

2. An apparatus as in claim 1, wherein the polarizer housing device further comprises:

a lens, the propagation space being between the polarizer and the lens, wherein the light polarized by the polarizer travels through the propagation space to the lens and is guided by the lens to the input end of the optical waveguide.

3. An apparatus as in claim 2, wherein the polarizer housing device further comprises:

a bonding surface; and an adhesive bonding the polarizer to the bonding surface, no adhesive being in the propagation space.

4. An apparatus as in claim 3, wherein the polarizer housing device further comprises:

a reservoir positioned to absorb excess adhesive used to bond the polarizer to the bonding surface, so that the excess adhesive does not flow into the propagation space.

5. An apparatus as in claim 2, further comprising:

a means for bonding the polarizer to the polarizer housing device with an adhesive so that no adhesive flows into the propagation space.

6. An apparatus as in claim 2, wherein the light polarized by the polarizer travels through the propagation space in a propagation direction, the propagation space being a first space in the polarizer housing device, the polarizer housing device having a second space and further comprising:

a surface perpendicular to the propagation direction and having the polarizer bonded thereto, the surface being between the first space and the second space and having a hole therein which connects the first space to the second space.

7. An apparatus as in claim 2, further comprising:

an optical fiber connected to the polarizer housing device and providing the light to the polarizer.

8. An apparatus as in claim 1, wherein the polarizer housing device further comprises:

a bonding surface; and an adhesive bonding the polarizer to the bonding surface, no adhesive being in the propagation space.

9. An apparatus as in claim 8, wherein the polarizer housing device further comprises:

a reservoir positioned to absorb excess adhesive used to bond the polarizer to the bonding surface, so that the excess adhesive does not flow into the propagation space.

10. An apparatus as in claim 1, wherein the polarizer housing device is connected to the input end of the optical waveguide by laser beam welding.

11. An apparatus as in claim 1, wherein the light polarized by the polarizer travels through the propagation space in a propagation direction, the propagation space being a first space in the polarizer housing device, the polarizer housing device having a second space and further comprising:

a surface perpendicular to the propagation direction and having the polarizer bonded thereto, the surface being between the first space and the second space and having a hole therein which connects the first space to the second space.

12. An apparatus as in claim 1, wherein the polarizer housing device includes:

a positioning marker for positioning the polarizer.

13. An apparatus as in claim 1, wherein the polarizer includes an identifier which identifies a polarization direction of the polarizer.

14. An apparatus as in claim 1, wherein the polarizer is a rutile plate cut from a wafer of birefringent crystal of rutile.

15. An apparatus as in claim 1, further comprising:

a means for bonding the polarizer to the polarizer housing device with an adhesive so that no adhesive flows into the propagation space.

16. An apparatus comprising:

an optical waveguide having an input end to receive light; and a polarizer housing device connected to the input end of the optical waveguide, the polarizer housing device including a polarizer which polarizes light, and a lens, a propagation space being in the polarizer housing device and between the polarizer and the lens, wherein the light polarized by the polarizer travels through the propagation space to the lens and is guided by the lens to the input end of the optical waveguide.

17. An apparatus as in claim 16, wherein the optical waveguide is a Mach-Zehnder optical waveguide.

18. An optical modulator comprising:

a Mach-Zehnder optical waveguide having an input end to receive light; and a polarizer housing device connected to the input end of the optical waveguide, the polarizer housing device including a polarizer which polarizes light, and a lens, a propagation space being in the polarizer housing device between the polarizer and the lens, wherein the light polarized by the polarizer travels through the propagation space to the lens and is guided by the lens to the input end of the optical waveguide.

19. An apparatus which connects to an input end of an optical waveguide for providing polarized light to the optical waveguide, the apparatus comprising:

a housing; and a polarizer inside the housing and which polarizes light, wherein, when the apparatus is connected to the input end of the optical waveguide,
- a propagation space exists in the polarizer housing device between the polarizer and the input end of the optical waveguide, and
- the light polarized by the polarizer travels through the propagation space to the input end of the optical waveguide.

20. An apparatus as in claim 19, further comprising:

a lens inside the housing, the propagation space being between the polarizer and the lens, wherein, when the apparatus is connected to the input end of the optical waveguide, the light polarized by the polarizer travels through the propagation space to the lens and is guided by the lens to the input end of the optical waveguide.

* * * * *